United States Patent
Shin et al.

(10) Patent No.: US 7,821,993 B2
(45) Date of Patent: Oct. 26, 2010

(54) WIRELESS NETWORK DEVICE AND RESOURCE ALLOTTING METHOD FOR THE SAME

(75) Inventors: Dong-yun Shin, Seongnam-si (KR); Jong-won Kim, Gwangsan-gu (KR); Giu-yeol Kim, Suwon-si (KR); Ha-young Yoon, Buk-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 921 days.

(21) Appl. No.: 11/602,959

(22) Filed: Nov. 22, 2006

(65) Prior Publication Data

US 2007/0115879 A1 May 24, 2007

(30) Foreign Application Priority Data

Nov. 22, 2005 (KR) .................. 10-2005-0111979

(51) Int. Cl.
*H04W 4/00* (2009.01)
(52) U.S. Cl. ................ 370/329; 370/338; 370/468; 455/450; 455/452.2
(58) Field of Classification Search ........... 370/338, 370/230, 468, 328–329; 455/450–453
See application file for complete search history.

(56) References Cited

U.S. PATENT DOCUMENTS

| | | | | |
|---|---|---|---|---|
| 4,593,282 A * | 6/1986 | Acampora et al. | ........... | 370/447 |
| 6,909,901 B2 * | 6/2005 | Terry et al. | ............... | 455/452.2 |
| 7,076,249 B2 * | 7/2006 | Svedevall et al. | ........... | 455/436 |
| 7,120,445 B2 * | 10/2006 | DeMarco et al. | ......... | 455/452.2 |
| 7,263,371 B2 * | 8/2007 | Das et al. | ................. | 455/456.1 |
| 7,286,484 B2 * | 10/2007 | Ren et al. | .................... | 370/252 |
| 7,289,453 B2 * | 10/2007 | Riedel et al. | ................ | 370/252 |
| 7,440,760 B2 * | 10/2008 | Valenzuela | ............... | 455/452.2 |
| 7,460,514 B2 * | 12/2008 | Ganz et al. | .................. | 370/346 |
| 7,471,626 B2 * | 12/2008 | Naghian et al. | ............. | 370/229 |
| 7,653,024 B2 * | 1/2010 | Dekorsy et al. | ............. | 370/329 |
| 7,697,938 B2 * | 4/2010 | Chang et al. | ................ | 455/450 |
| 7,729,347 B2 * | 6/2010 | Rosberg | ..................... | 370/389 |
| 2002/0154656 A1 * | 10/2002 | Kitchin | ........................ | 370/468 |
| 2002/0191559 A1 * | 12/2002 | Chen et al. | .................. | 370/329 |
| 2004/0160922 A1 * | 8/2004 | Nanda et al. | ................ | 370/335 |
| 2005/0009533 A1 | 1/2005 | Benveniste et al. | | |

(Continued)

FOREIGN PATENT DOCUMENTS

CN        1282174 A     1/2001

(Continued)

OTHER PUBLICATIONS

Japanese Patent Office Action dated Apr. 6, 2010 issued in Japanese counterpart Application No. 2006-309351.

*Primary Examiner*—Sharad Rampuria
(74) *Attorney, Agent, or Firm*—Sughrue Mion, PLLC

(57) ABSTRACT

A method and apparatus for a wireless network to maintain a QOS is provided. The apparatus includes a resource calculating unit which calculates resources needed to transmit packets if a transmission rate of a network changes, a comparing unit which compares the calculated resources and resources allotted by an access point of the network; and a control unit which determines whether to request additional resources by using a result of the comparison by the comparing unit.

18 Claims, 7 Drawing Sheets

U.S. PATENT DOCUMENTS

| | | | |
|---|---|---|---|
| 2005/0058151 A1* | 3/2005 | Yeh | 370/445 |
| 2006/0203724 A1* | 9/2006 | Ghosh et al. | 370/229 |
| 2007/0104174 A1* | 5/2007 | Nystrom et al. | 370/343 |
| 2007/0115879 A1* | 5/2007 | Shin et al. | 370/329 |
| 2007/0189320 A1* | 8/2007 | Wu et al. | 370/437 |
| 2009/0274045 A1* | 11/2009 | Meier et al. | 370/235 |

FOREIGN PATENT DOCUMENTS

| | | |
|---|---|---|
| EP | 1575326 A2 | 9/2005 |
| JP | 2002-247131 A | 8/2002 |
| JP | 2003-505930 A | 2/2003 |
| JP | 2005-236416 A | 9/2005 |
| KR | 10-2005-0057124 A | 6/2005 |
| KR | 10-2005-0061141 A | 6/2005 |
| KR | 10-2005-0066301 A | 6/2005 |
| KR | 10-0610804 B1 | 8/2006 |
| WO | 00/49824 A1 | 8/2000 |
| WO | 02/052875 A2 | 7/2002 |
| WO | 2004/047376 A1 | 6/2004 |

* cited by examiner

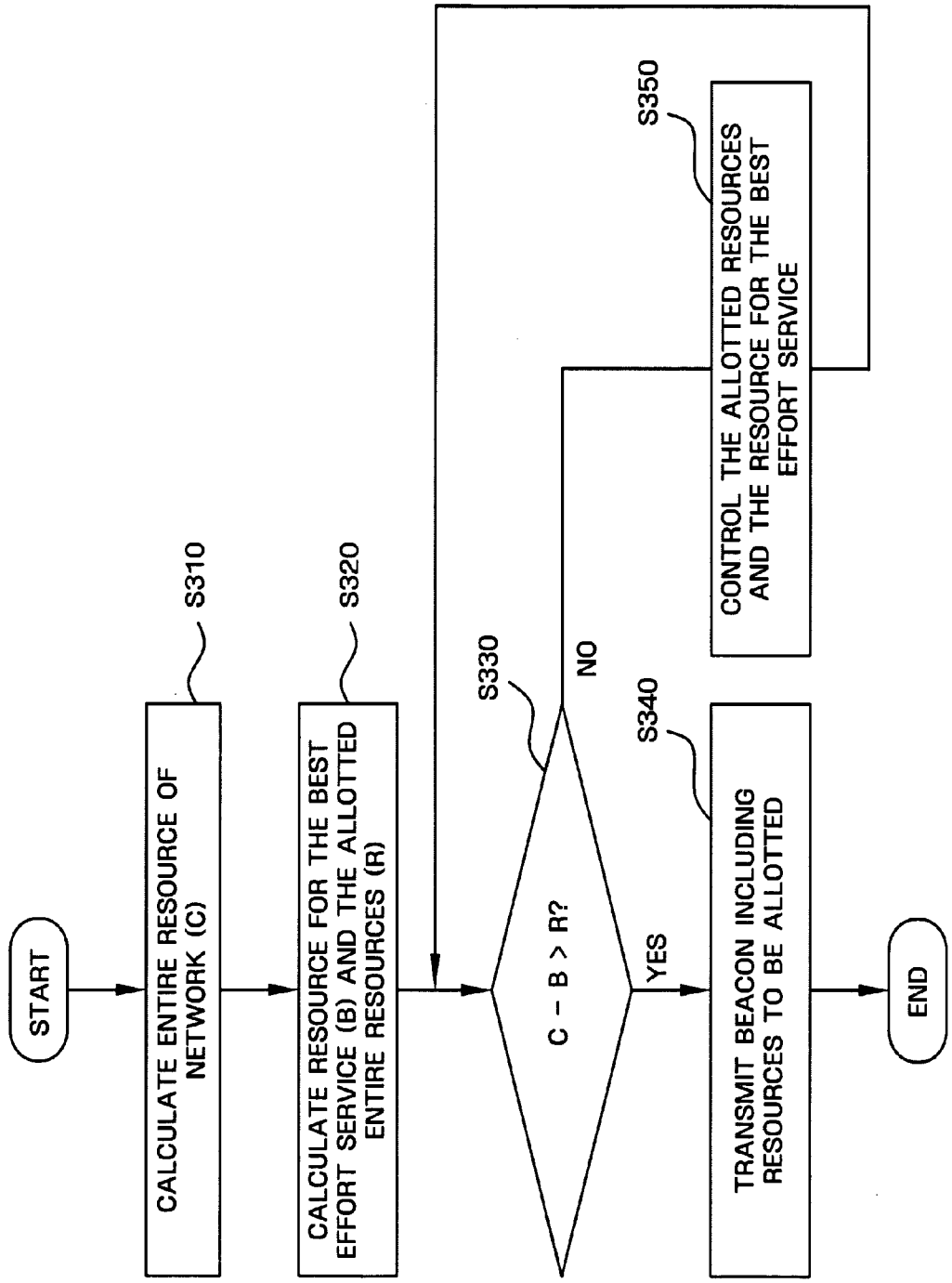

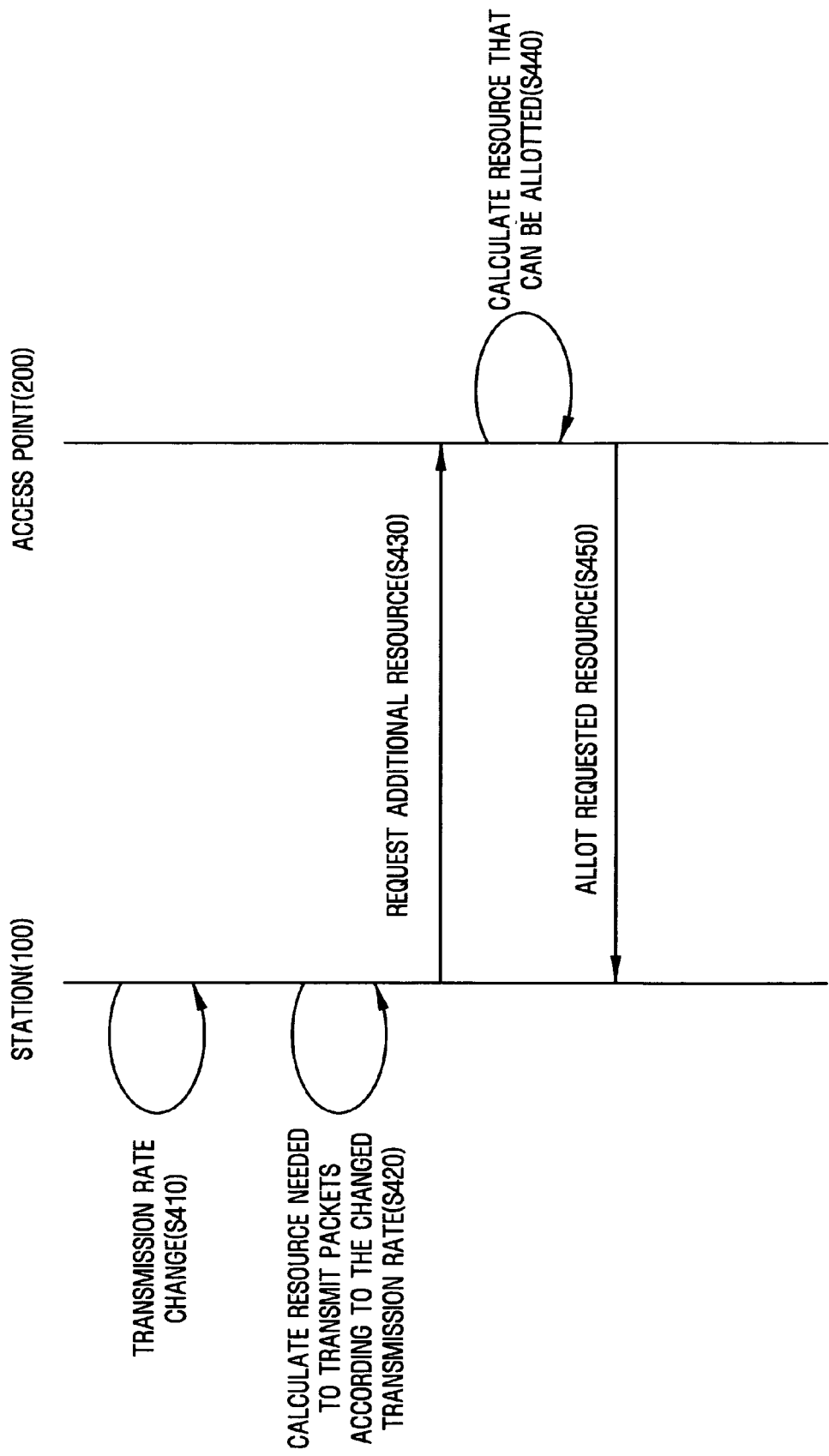

WIRELESS NETWORK DEVICE AND RESOURCE ALLOTTING METHOD FOR THE SAME

CROSS-REFERENCE TO RELATED APPLICATION

This application is based on and claims priority from Korean Patent Application No. 10-2005-0111979 filed on Nov. 22, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to allotting resources for a wireless network device and, more particularly, to allotting resources for a wireless network the same that actively reacts to a packet transmission rate, thereby maintaining quality of service (QoS) and using network resources efficiently.

2. Description of the Related Art

Development of high-quality multimedia devices such as set-top boxes, digital televisions, personal digital assistants (PDAs), and wireless Internet devices brings various architectures which increases a user's demand for a multimedia service. Accordingly, network designers and engineers have endeavored to design a system that can meet the increased demand for real-time and non real-time multimedia data transmissions.

The Internet Protocol (IP) provides a "best effort service", which does not secure a service level for a user. The best effort service via an IP network is able to simplify a network because a complexity of a network exists in an end-host. The remarkable growth of Internet shows how effective the best effort service is.

The IEEE 802.11 wireless LAN (WLAN) standard is a popular technology of broadband wireless access for mobile devices. IEEE 802.11 can be considered as a wireless version of "Ethernet" because IEEE 802.11 supports the best effort service. The IEEE 802.11 working group provides a new supplement to the conventional legacy IEEE 802.11 medium access control (MAC) layer in order to support quality of service (QoS).

The new IEEE 802.11e MAC standard provides applications such as sound and video services via the WLAN, so that the application of IEEE 802.11 is extended. The IEEE 802.11e standard is a general wireless standard for industries that support QoS. The IEEE 802.11e continuously interacts with home, business, and public access networks, which still provides a feature for meeting each type of network's own demand. The IEEE 802.11e is perfectly compatible with the conventional legacy standard, and provides wireless standard via home and business environments by adding a QoS feature and business environments to the conventional IEEE 802.11 standard.

QoS support for multimedia data is important to a home network where voice, audio, and video data is transmitted to several networked home electronic devices and personal computers. A broadband service provider considers that the QoS and multimedia network are essential to provide a user with a value-added service such as ready-made video, voice via ready-made video IP, and high-speed Internet access.

To provide an appropriate service, it is necessary for a network service to have a certain quality level, and for a network to be able to separate traffic having a strict timing requirement to avoid delays, jitters, and losses from a different type of traffic. Also, a QoS protocol is required. The QoS does not generate bandwidth, but efficiently manages bandwidth in order to meet a wide range of demands. The QoS is to provide best effort services and several levels of prediction over the current Internet protocol.

The IEEE 802.11e standard discloses a protocol for negotiating a QoS requirement for a traffic stream. A scheduler in a hybrid coordinator decides a service schedule for each station. Scheduling is performed to meet the pre-negotiated QoS requirement.

A station requests the allotting of resources to an access point for transmitting packets, and the access point allots the resources requested by the station, which may be efficient to secure QoS, but may reduce the efficiency of use of the limited resources. Resources, which are requested from the access point by the station in order to transmit packets, do not consider a transmission rate of a physical layer. Accordingly, it is difficult to efficiently use the limited resources if the transmission rate of a physical layer is high or low for resources requested by the station.

FIG. 1 depicts a method of allotting resources between a general station and an access point.

In the method of allotting resources between a general station and an access point illustrated in FIG. 1, a station 10 calculates resources needed to transmit packets to an access point 20 (S10), and requests resources based on the calculated result from the access point 20 (S20). Then the access point 20 determines whether there are resources that can be allotted to the station 10 (S30).

If the access point 20 can allot the resources requested by station 10, the access point 20 allots the resources to the station 10 (S40).

In the method of allotting resources between a general station and an access point, the station does not consider a transmission rate of a physical layer where packets are transmitted. When the resources allotted to station are less than the transmission rate of the physical layer, the time allotted for transmitting packets is increased. When the resources allotted to a station are more than the transmission rate of the physical layer, surplus resources exist. Accordingly, it is necessary for the QoS to be efficiently secured by managing resources according to the transmission rate of the physical layer.

The Korean Unexamined Patent No. 10-2005-0057124 discloses a method of providing a QoS service schedule that creates a QoS schedule for a wireless station in a wireless network, and transmits the created QoS schedule from a hybrid coordinator to the wireless station, which is capable of using the QoS schedule in the wireless station to perform power management by entering a power save mode during times when the hybrid coordinator has not scheduled any transmission opportunities; however, a method of using WLAN resources efficiently by actively reacting to a changing transmission rate of a physical later and maintaining QoS is not disclosed.

SUMMARY OF THE INVENTION

The present invention provides a wireless network device and resource allotting method which detects a change of a transmission rate of a physical layer close to a transmission rate of network, manage resources efficiently according to the transmission rate of a physical layer, and maintain QoS.

According to an aspect of the present invention, there is provided a wireless network device including a resource calculating unit that calculates resources needed to transmit predetermined packets when a transmission rate of predetermined network is changed, a comparing unit that compares the calculated resources and resources allotted by an access point of the network, and a control unit that determines whether to request additional resources in accordance with the result of the comparison.

According to another aspect of the present invention, there is provided a wireless network device including a resource request receiving unit that receives a resource request from a station transmitting packets via a network, a resource calculating unit that calculates resources that can be allotted by the network according to the received request, and a control unit that determines whether to allot additional resources from the station in accordance with the result of the comparison.

According to a further aspect of the present invention, there is provided a method of allotting resources for a wireless network device including calculating resources needed to transmit predetermined packets when a transmission rate of predetermined network is changed, comparing the calculated resources and resources allotted by an access point of the network, and determining whether to request to additional resources in accordance with the result of the comparison.

According to another aspect of the present invention, there is provided a method of allotting resources for a wireless network device including receiving a resource request from a station transmitting packets via network, calculating a resource that can be allotted by the network according to the received request, and determining whether to allot additional resources from the station in accordance with the result of the comparison.

BRIEF DESCRIPTION OF THE DRAWINGS

The above and other aspects of the present invention will become apparent by describing in detail exemplary embodiments thereof with reference to the attached drawings in which:

FIG. 6 illustrates a method of transmitting a beacon to an access point according to an exemplary embodiment of the present invention;

FIG. 7 illustrates a method of allotting resources between a general station and an access point according to an exemplary embodiment of the present invention.

DETAILED DESCRIPTION OF EXEMPLARY EMBODIMENTS OF THE INVENTION

Figure 1:
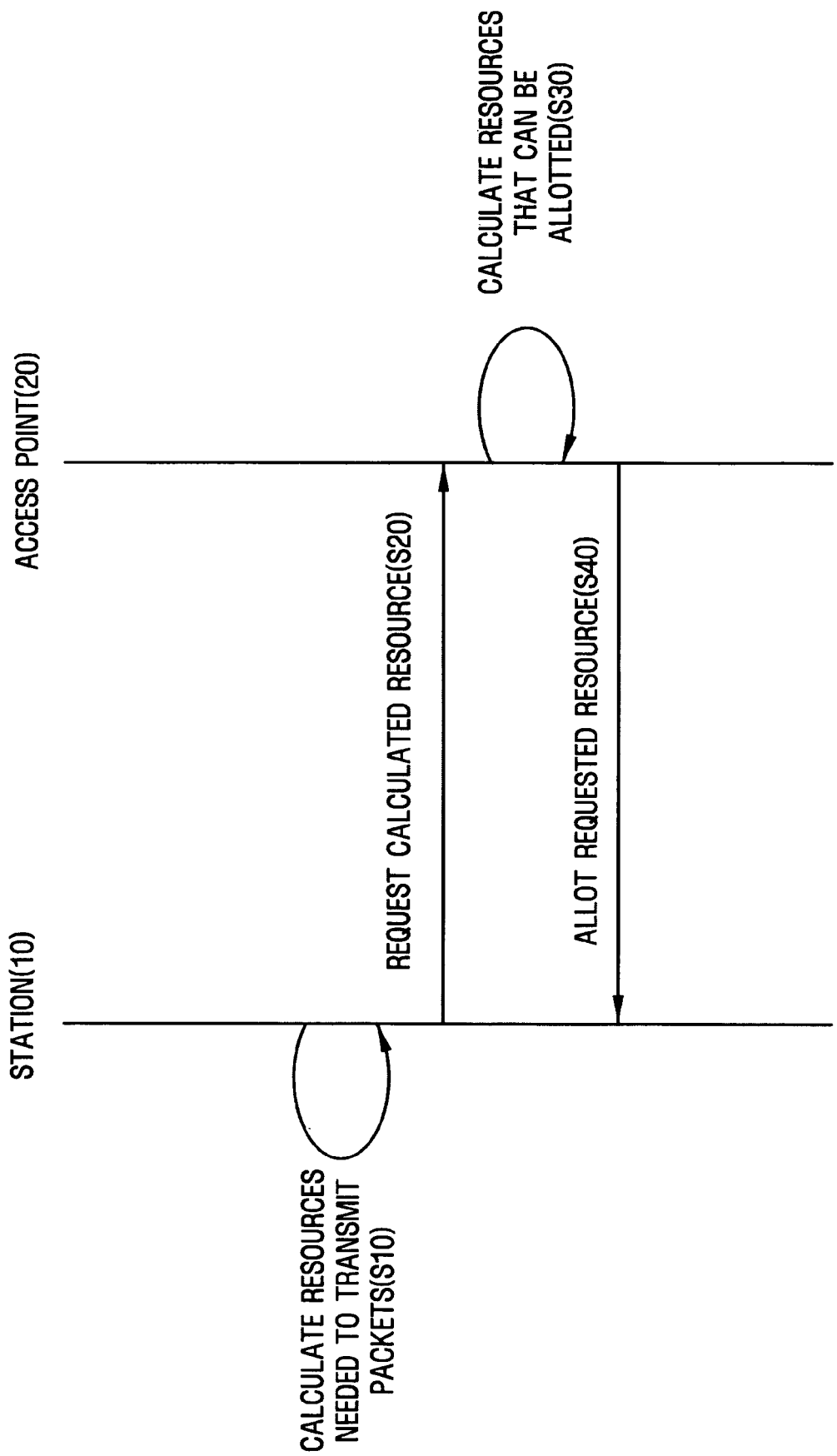
FIG. 1 depicts a method of allotting resources between a general station and an access point.

Exemplary embodiments of the present invention will be described in detail with reference to the accompanying drawings.

Aspects and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 2:
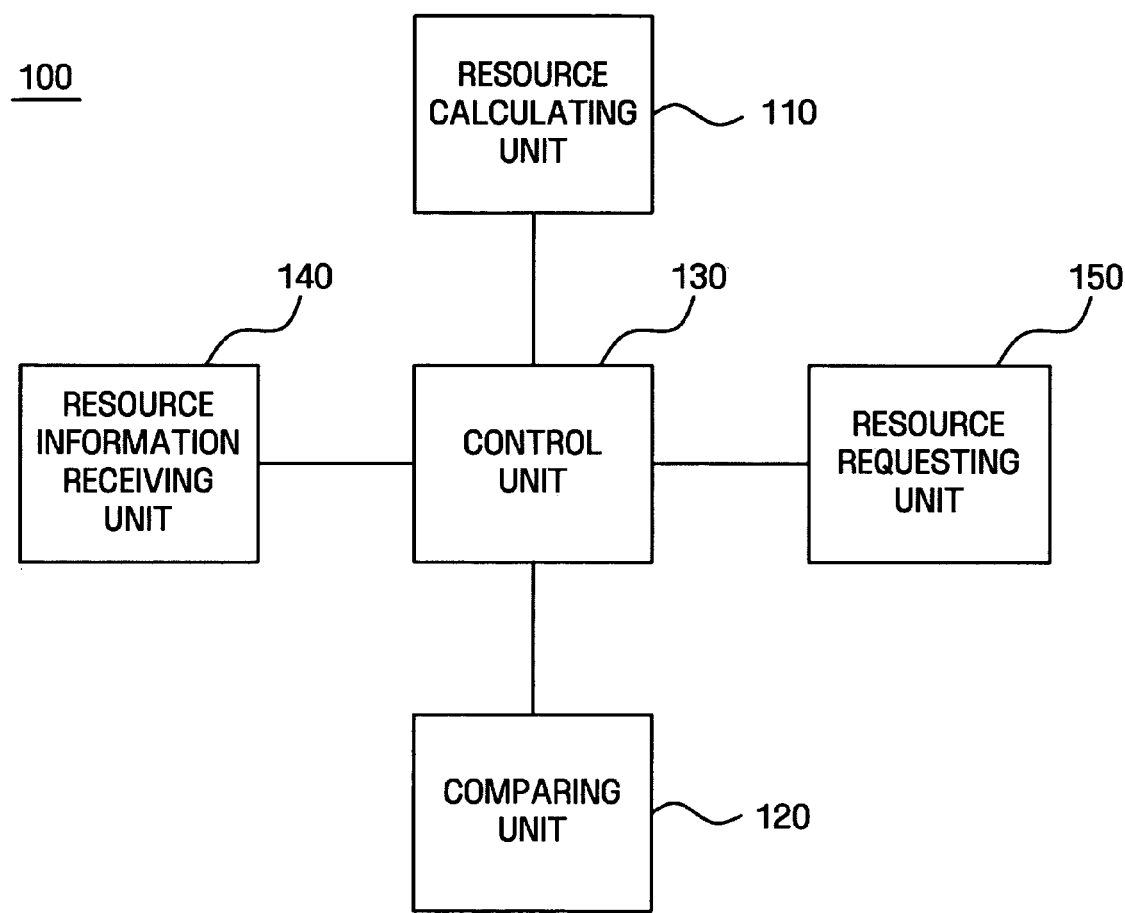
FIG. 2 depicts a station according to an exemplary embodiment of the present invention.

FIG. 2 depicts a station according to an exemplary embodiment of the present invention.

As illustrated in FIG. 2, a station 100 includes a resource-calculating unit 110, a comparing unit 120, a control unit 130, a resource-information-receiving unit 140, and a resource-requesting unit 150.

The resource-calculating unit 110 may calculate resources needed to transmit packets by way of a network. The needed resources are different according to whether the packet transmitted by the station 100 is real-time multimedia data or is transmitted via the best effort service. If the packet transmitted by the station 100 is real-time multimedia data, the packet needs more resources than the best-effort-service case. Here, "resource" means a time allotted in order for each station in a network to transmit packets.

The resource-calculating unit 110 may calculate resources according to a transmission rate change of a physical layer that transmits real packets in an open system interconnection (OSI) layer as well as the change of the packet. The OSI layer is divided into physical, data link, network, transmission, session, expression, and application layers. Because the packet is transmitted via a physical layer, the transmission rate is dependent upon the lowest physical layer even if transmission rates of upper layers are high. When a transmission rate of the physical layer is decreased, the resource-calculating unit 110 detects the decrease, and calculates the time needed to transmit packets. The resource-calculating unit 110 calculates the time needed to transmit packets according to the transmission rate change at predetermined intervals, because frequent calculations may increase system loads.

The comparing unit 120 compares the resources that are calculated by the resource-calculating unit 110 and the resources that were already allotted by the station 100 in network. That is, the comparing unit 120 compares the resources that were allotted by the station 100 and the resources needed to receive the packet. The comparing unit 120 may omit the comparing of the allotted resources and the calculated resources when there are no allotted resources.

According to the result of the control unit 130, the control unit 130 determines whether to request additional resources. If the resources that were allotted by the station 100 are the best effort service and a packet to be transmitted is real-time multimedia data, the control unit 130 may request additional resources because more resources than these allotted are required. The control unit 130 may request additional resources because more resources are needed to transmit packets when the transmission rate decreases. If there is no the allotted resource, the control unit 130 may request resources for packets that are to be transmitted.

If the calculated resources are more than the allotted resource, the control unit 130 returns surplus resources to a network. Here, the returned resources may be re-allotted or allotted to another station later.

The resource information receiving unit 140 receives information on a resource to be allotted from a device that allots resources in network; the resource information may be continually received from the device that allots resources at predetermined intervals. By using the received resource information, the control unit 130 may prevent an unnecessary request for additional resources by determining in advance, whether requested additional resources may be allotted in a network. If a resource to be allotted, according to the received resource information, is less than the requested resource, the control unit 130 may transmit packets via the best effort service without requesting additional resources.

The resource-requesting unit 150 may request additional resources from a device that allots resources to the network according to a control by the control unit 130. If the control unit 130 determines that resources that can be allotted by the control unit 130 are less than the requested additional resources, the resource requesting unit 150 may request additional resources from the device that allots resources.

Figure 3:
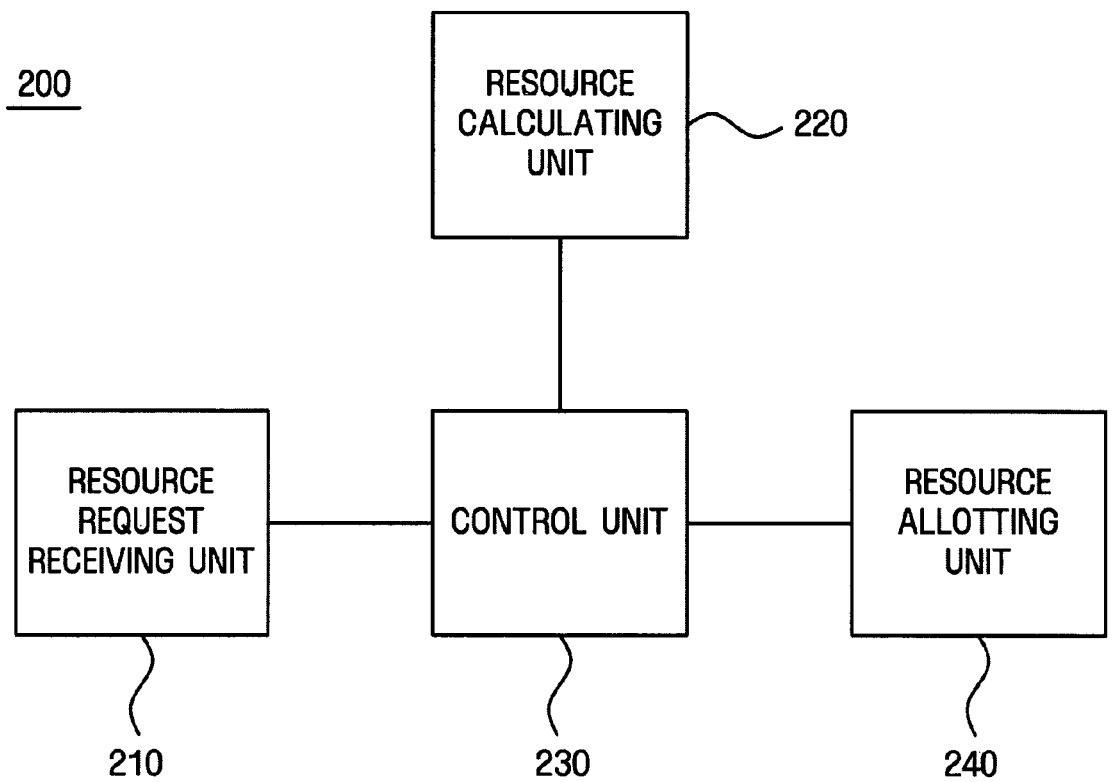
FIG. 3 depicts an access point according to an exemplary embodiment of the present invention.

FIG. 3 depicts an access point according to an exemplary embodiment of the present invention.

As illustrated in FIG. 3, an access point 200 includes a resource request receiving unit 210, a resource calculating unit 220, a control unit 230, and a resource allotting unit 240.

The resource request receiving unit 210 receives a resource request from a predetermined device in network. Here, the received resource request may be for resources additional to the allotted resources or for predetermined packets if there are no allotted resources.

The resource-calculating unit 220 calculates a resource to be allotted, according to the resource request received by the resource request receiving unit 210. Particularly, the resource calculating unit 220 calculates a resource to be allotted, using information on all the resources of network, the amount of resources for the best effort service, and the entire allotted resources. If C refers to all the resources of a network, B refers to the amount of resources for the best effort service, and R refers to the entire allotted resources, AR, referring to a resource to be allotted, can be calculated by C−B−R. Here, $C \leq B+R$. When C−B>R, the access point 200 may allot predetermined resources to a device in the network.

The resource-calculating unit 220 transmits a beacon including information on the resource to be allotted, through AR with a resources request at predetermined intervals. Devices in a network may determine the resource to be allotted, through the received beacon.

The control unit 230 determines whether to allot resources to the device that requests the resources according to the calculated result. Particularly, the control unit 230 determines whether the requested resources can be allotted, and allots the resources to the device via the resource allotting unit 240 when possible.

Figure 4:
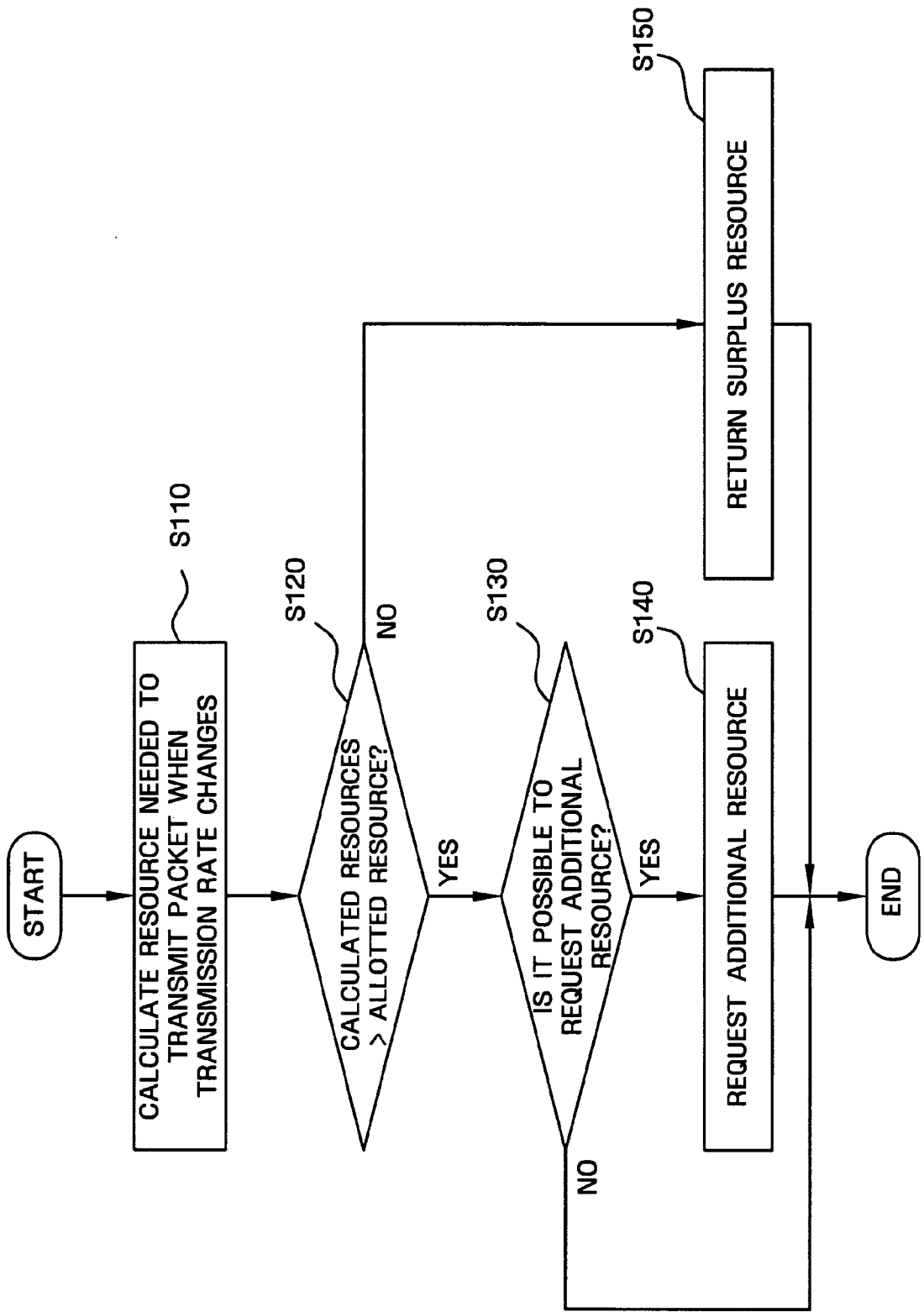
FIG. 4 illustrates a method of requesting additional resources by a station according to an exemplary embodiment of the present invention.

FIG. 4 illustrates a station's method of requesting additional resources according to an exemplary embodiment of the present invention.

In the method of requesting additional resources illustrated in FIG. 4, the resource calculating unit 110 of the station 100 calculates resources needed to transmit packets (S110). The present invention is described with reference to a case when the resource calculating unit 110 calculates resources needed due to a change in the transmission rate, but is not limited thereto. When the type of packets to be transmitted is changed, the needed resources can also be calculated.

The comparing unit 120 compares the calculated resources and the allotted resources (S120). The comparing unit 120 may omit the comparing of the allotted resources and the calculated resources when there is no allotted resource.

If the calculated resources are more than the allotted resources, i.e., the resources needed to transmit packets are insufficient, the control unit 130 determines whether additional resources can be requested (S130). Then, if the additional resources can be requested, the control unit requests the additional resources via the resource-requesting unit 150 (S140). That is, the control unit 130 can pre-determine a resource to be allotted, using the resource information received from the resource information receiving unit 140, and request additional resources via the resource requesting unit 150.

If the allotted resources are more than the calculated resources, surplus resources are returned (S150). The returned surplus resources may be re-allotted to another station later.

Figure 5:
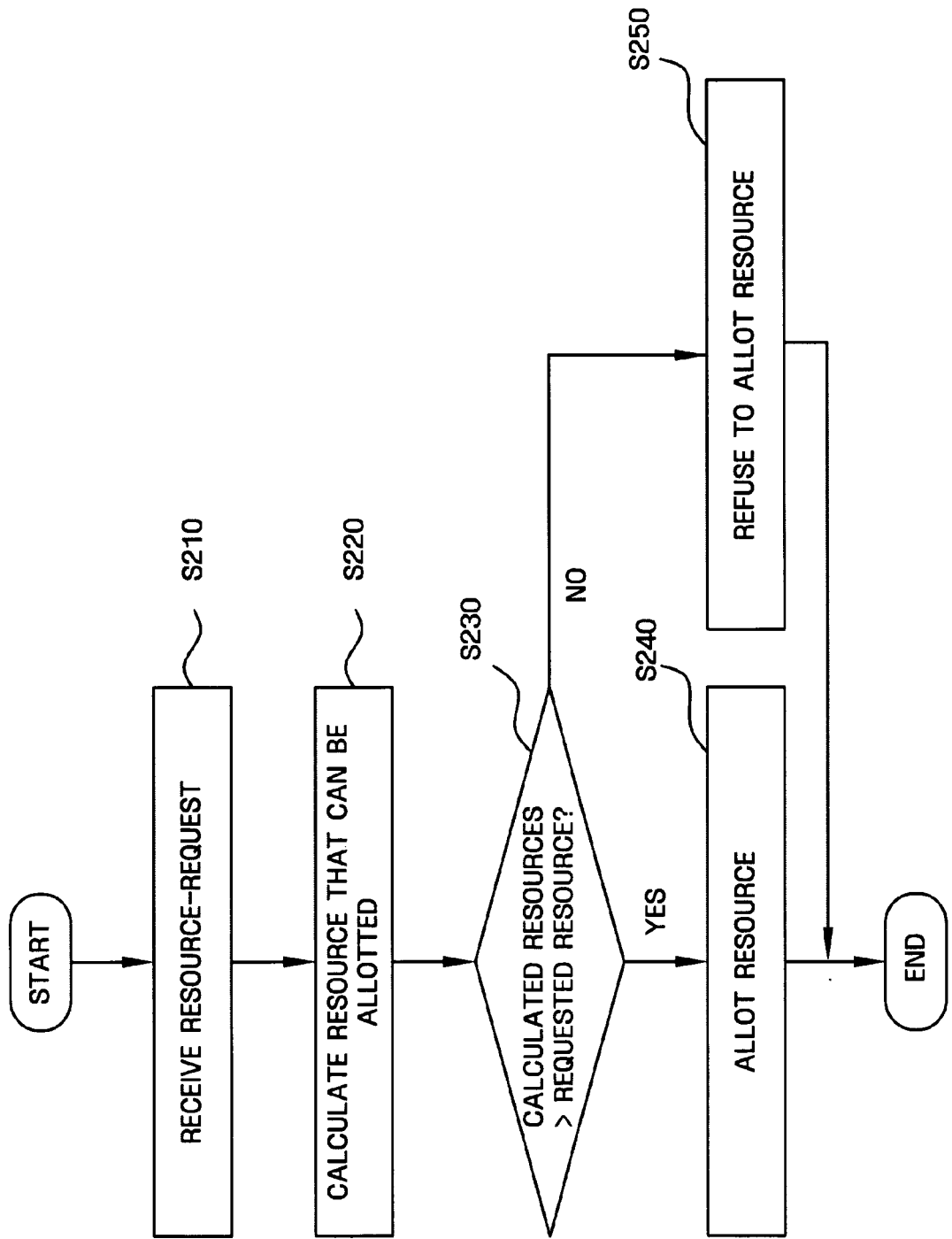
FIG. 5 illustrates a method of processing a resource request of an access point according to an exemplary embodiment of the present invention.

FIG. 5 illustrates a method of processing a resource request of an access point according to an exemplary embodiment of the present invention.

In the method of processing a resource request of an access point illustrated in FIG. 5, the access point 200 receives a resource request of the station 100 (S210). Particularly, the access point 200 receives a resource request of the station 100 via the resource request receiving unit 210.

The resource calculating unit 220 calculates the resource to be allotted, by the AR (S220).

The control unit 230 compares the calculated resources and resources corresponding to the received resources request S230.

If the calculated resources are more than the requested resources, the control unit 230 allots the resources to the station that requests the resources via the resource allotting unit 240 (S240).

If the calculated resources are less than the requested resources, the control unit 230 refuses to allot the resources to the station that requests the resources (S250).

FIG. 6 illustrates a method of transmitting a beacon in an access point according to an exemplary embodiment of the present invention.

In the method of transmitting beacon in an access point illustrated in FIG. 6, the access point 200 calculates all the resources of a network C (S310).

Also, the access point 200 calculates the resources for the best effort service B and all the allotted resources R (S320).

The resource-calculating unit 220 of the access point 200 determines whether all the allotted resources are greater than all the resources of network minus the resources for the best effort service (S330).

If all the resources of a network minus the resources for the best effort service are more than all the allotted resources, the control unit 230 transmits a beacon including the resource to be allotted, to the stations in network because there is the resource to be allotted (S340).

If all the resources of a network minus the resources for the best effort service is less than all the allotted resources, the control unit 230 secures the resource to be allotted by controlling the allotted resources and the resources for the best effort service because there is no resource to be allotted (S350).

FIG. 7 illustrates a method of allotting resources between a general station and an access point according to an exemplary embodiment of the present invention.

In the method of allotting resources between a general station and an access point illustrated in FIG. 7, if the transmission rate changes in the station 100 (S410), the station 100 calculates resources needed to transmit packets according to the changed transmission rate (S420). The present invention is described with reference to a case when the station 100 calculates resources needed to transmit packets according to the transmission rate change, but is not limited thereto.

The station can calculate resources needed to transmit packets according to a type of packet, i.e., whether the packet is to be transmitted via the best effort service or is real-time multimedia data.

If resources were not allotted or allotted resources are less than the resources needed to transmit packets, the station 100 requests the resources to the access point 200 (S430). When the allotted resources are greater than the resources needed to transmit packets, the station 100 returns the surplus resources.

The access point 200 calculates the resource to be allotted, according to a resource request of the station 100 (S440). That is, the access point 200 calculates the to-be-allotted resource as illustrated in FIG. 5, if the resources can be allotted; the access point 200 allots the resources requested by the station 100 (S450).

The term "module", as used herein, means, but is not limited to, a software or hardware component, such as a Field Programmable Gate Array (FPGA) or an Application Specific Integrated Circuit (ASIC), which executes certain tasks. A module may advantageously be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to the exemplary embodiments of the present invention, if resources are allotted to a station, the wireless network device and a resources allotting method for the same manages the resources adaptively according to a transmission rate change of a physical layer; therefore it is possible to efficiently use limited resources and secure QoS.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless network device comprising:
   a resource calculating unit which calculates resources needed to transmit packets if a transmission rate of a network changes;
   a comparing unit which compares the calculated resources and resources allotted by an access point of the network; and
   a control unit which determines whether to request additional resources by using a result of the comparison by the comparing unit;
   a resource information receiving unit which receives resource information transmitted by the access point;
   a resource requesting unit which requests the additional resources according to a control of the control unit if the calculated resources are greater than the resources allotted by the access point; and
   a resource receiving unit which receives the additional resources according to the request;
   wherein the resource information comprises a difference between all resources of the network less resources for best effort service, and the resources allotted by the access point, the difference being surplus resources;
   wherein, if the surplus resources included in the resource information are greater than the additional resources, the resource requesting unit requests the additional resources;
   wherein, if the surplus resources included in the resource information are less than the additional resources, the control unit transmits the packets via the best effort service.

2. The device of claim 1, wherein the resource calculating unit calculates the resources needed to transmit the packets at predetermined intervals.

3. The device of claim 1, wherein, if the resources allotted are greater than the calculated resources, the control unit returns surplus resources.

4. The device of claim 1, wherein, if the calculated resources are greater than the resources allotted by the access point, the control unit requests the additional resources.

5. The device of claim 1, wherein, if the surplus resources are greater than the additional resources, the access point allots resources according to the request for additional resources.

6. A wireless network device comprising:
   a resource request receiving unit which receives a resource request of a station transmitting packets via network;
   a resource calculating unit which calculates resources to be allotted in the network according to the received resource request;
   a control unit which determines whether to allot additional resources to the station according to a result of the calculation by the resource calculating unit;
   wherein the resources calculating unit transmits a beacon including information on surplus resources which is a difference between all resources of the network less resources for best effort service, and the resources to be allotted;

wherein, if all the resources of the network less resources for the best effort service, are less than the resources to be allotted, the control unit secures the surplus resources by controlling the resources to be allotted and the resources for the best effort service;

wherein, if the surplus resources are greater than requested additional resources, the control unit allots the requested additional resources from the station.

7. The device of claim 6, wherein the station calculates resources needed to transmit the packets if a transmission rate of the network changes, and requests resources according to result of the calculation.

8. A method of allotting resources for a wireless network device, the method comprising:

calculating resources needed to transmit packets if a transmission rate of a network changes;

comparing the calculated resources and resources allotted by an access point of the network; and determining whether to request additional resources based on a result of the comparing;

receiving resource information transmitted by the access point;

requesting the additional resources according to a control of the control unit if the calculated resources are greater than the resources allotted by the access point, in a request; and receiving the additional resources according to the request;

wherein the resource information comprises a difference between all the resources of the networkless resources for best effort service, and the resources allotted, the difference being surplus resources;

wherein, if the surplus resources included in the resource information are greater than the additional resources, the requesting comprises requesting the additional resources;

wherein, if the surplus resources included in the resource information are less than the additional resources, the determining comprises transmitting the packets via the best effort service.

9. The method of claim 8, wherein the calculating comprises calculating the resources needed to transmit the packets at predetermined intervals.

10. The method of claim 8, wherein, if the resources allotted are greater than the calculated resources, the determining comprises returning surplus resources.

11. The method of claim 8, wherein, if the calculated resources are greater than the resources allotted by the access point, the determining comprises requesting additional resources from the access point.

12. The method of claim 8, wherein, if the surplus resources are greater than the additional resources, the access point allots resources according to the request for additional resources.

13. A method of allotting resources for a network device, the method comprising:

receiving a resource request of a station transmitting packets via a network;

calculating resources to be allotted, in the network according to the received resource request;

determining whether to allot additional resources to the station according to a result of the calculating;

wherein the calculating comprises transmitting beacon including information on surplus resources which is a difference between all resources of the network less resources for best effort service, and the resources to be allotted;

wherein, if all the resources of the network less resources for the best effort service, are less than the resources to be allotted, the determining comprises securing the surplus resources by controlling the resources to be allotted and the resources for the best effort service;

wherein, if the surplus resources are greater than the requested additional resources, the determining comprises allotting the requested additional resources to the station.

14. The method of claim 13, wherein the station calculates resources needed to transmit the packets if a transmission rate of the network changes, and requests resources according to the calculated result.

15. The wireless network device of claim 1, wherein the resource calculating unit determines resources needed for best effort service, determines all resources of the network, calculates a difference between the determined all resources of the network and the determined resources needed for best effort service, and allocates predetermined resources if the calculated difference is greater than the allotted resources.

16. The wireless network device of claim 6, wherein the resource calculating unit determines resources needed for best effort service, determines all resources of the network, calculates a difference between the determined all resources of the network and the determined resources needed for best effort service, and allocates predetermined resources if the calculated difference is greater than the allotted resources.

17. The method of claim 8, further comprising:

determining resources needed for best effort service;

determining all resources of the network;

calculating a difference between the determined all resources of the network and the determined resources needed for best effort service, and;

allocating predetermined resources if the calculated difference is greater than the allotted resources.

18. The wireless network device of claim 1, wherein if all the resources of a network minus the resources for the best effort service are more than all the allotted resources, transmitting a beacon, the beacon including information on surplus resources which is a difference between all resources of the network less resources for best effort service, and the resources to be allotted.

* * * * *